United States Patent [19]
Yahagi

[11] Patent Number: 5,808,809
[45] Date of Patent: Sep. 15, 1998

[54] ZOOM LENS

[75] Inventor: Satoshi Yahagi, Omiya, Japan

[73] Assignee: Fuji Photo Optical Co., Ltd., Omiya, Japan

[21] Appl. No.: 873,400

[22] Filed: Jun. 12, 1997

[30] Foreign Application Priority Data

Jul. 16, 1996 [JP] Japan .................................. 8-206629

[51] Int. Cl.$^6$ ................................................. G02B 15/14
[52] U.S. Cl. .......................................... 359/683; 359/684
[58] Field of Search .................................. 359/683, 684, 359/676

[56] References Cited

U.S. PATENT DOCUMENTS 4,789,227  12/1988  Tanaka et al. ........................... 359/684
4,848,883   7/1989  Maruyama ............................... 359/684

Primary Examiner—Scott J. Sugarman
Attorney, Agent, or Firm—Ronald R. Snider

[57] ABSTRACT

A second lens group is divided into a negative second A lens group and a positive second B lens group, and the distance between the second A and B lens groups is made variable so as to correct a fluctuation in aberration caused by a change in focal length, thereby reducing the size and weight of the whole lens system, while the fluctuation in performance is kept low in the whole zoom range and whole focus range. The second lens group is constituted by the second A lens group having a negative refracting power and the second B lens group having a positive refracting power. Upon a change in focal length, the distance between the second A and B lens groups is altered so as to suppress the fluctuation in aberration mainly in a middle range. Namely, in the second lens group having the highest refracting power, a surface spacing highly sensitive to the change in aberration is altered, whereby the aberration can be corrected with a favorable balance. Specifically, as indicated by the moving loci in FIG. 1, during the movement from the wide angle end to the telephoto end, the second A and second B lens groups are moved such that the distance therebetween is narrowed in the middle range.

2 Claims, 7 Drawing Sheets

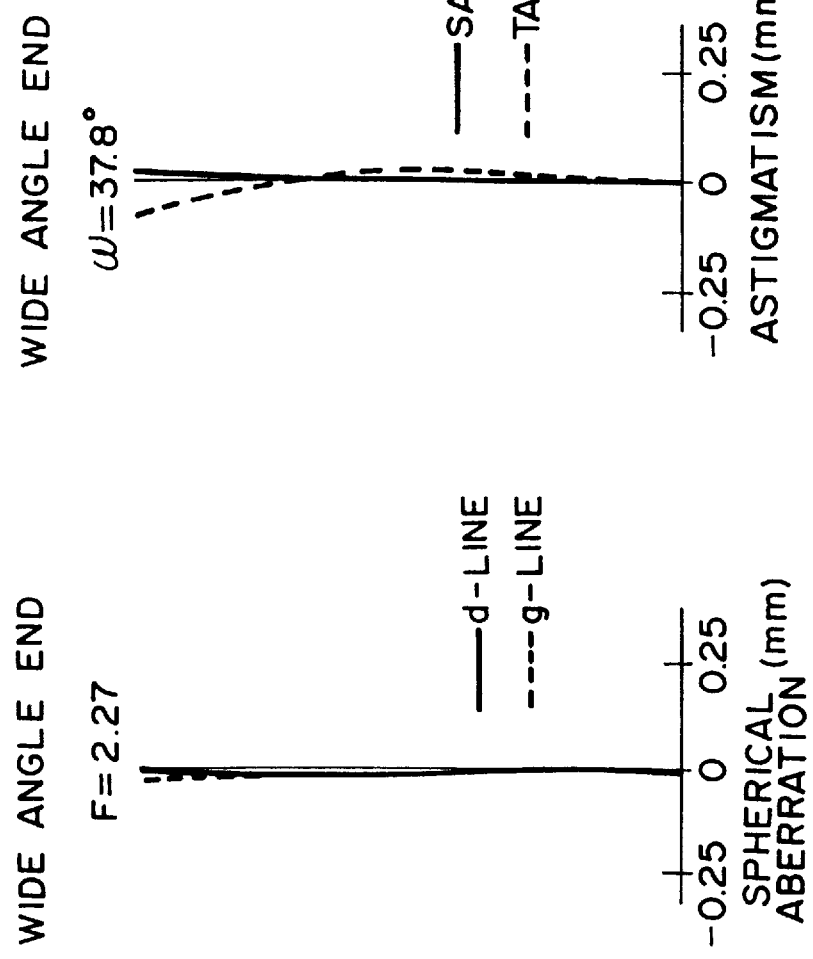
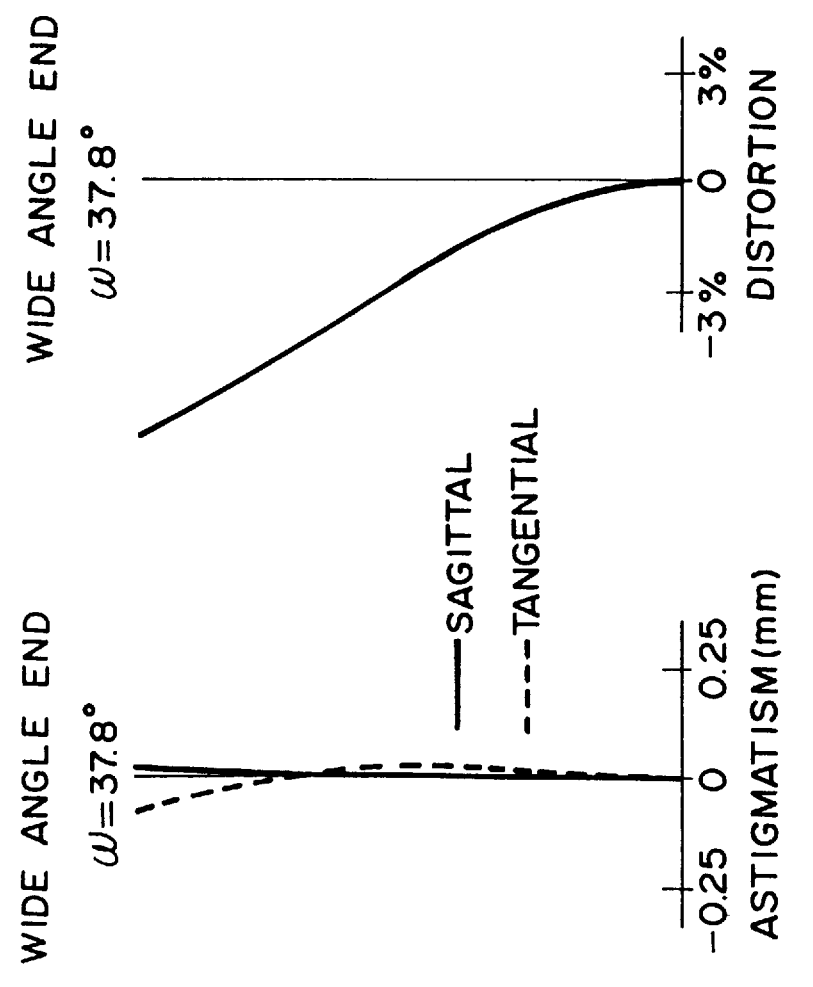
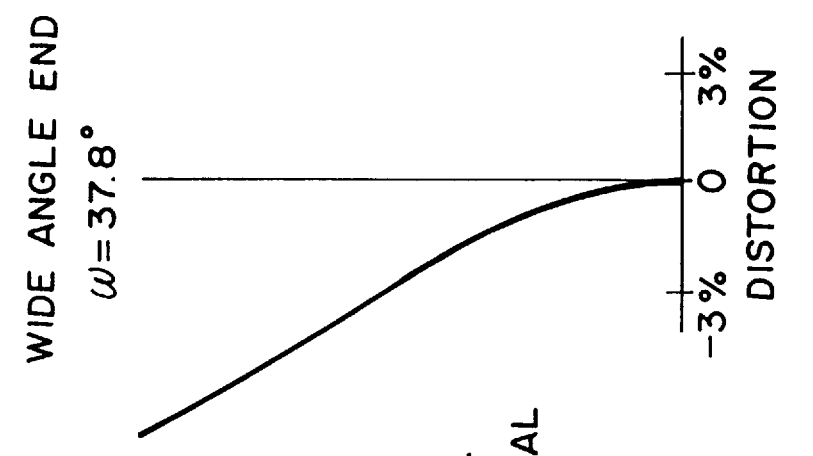

FIG. 5A TELEPHOTO END F=3.24
FIG. 5B TELEPHOTO END ω=1.9°
FIG. 5C TELEPHOTO END ω=1.9°

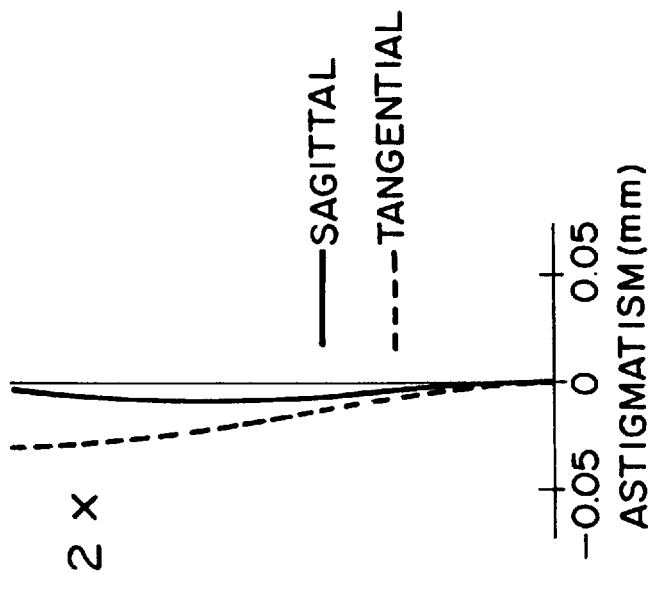
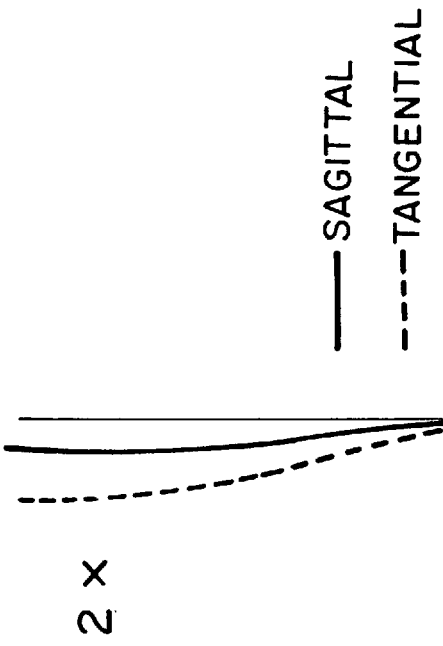

CONVENTIONAL EXAMPLE
ω=9.6°

EXAMPLE OF PRESENT INVENTION
ω=9.6°

ZOOM LENS

RELATED APPLICATIONS

This application claims the priority of Japanese Patent Application No. 8-206629 filed on Jul. 16, 1996, which is incorporated herein by reference.

BACKGROUND OF THE INVENTION

1. Field of the Invention

The present invention relates to a zoom lens and, in particular, to a zoom lens for a TV camera for broadcasting or business use requiring a high performance.

2. Description of the Prior Art

In the fields of broadcasting and business, there has been an increasing demand for a high-performance zoom lens with a small size and light weight. In particular, as high definition television broadcasting is currently being realized, there is an urgent need for developing a high-performance zoom lens with a practical size and weight.

The conventional zoom lenses, however, tend to have a larger number of lens sheets in order to attain a high performance, thereby increasing their weight and size. In particular, it is difficult to reduce the size and weight of the whole lens system while maintaining a high performance in the whole zoom range extending from the wide angle end to the telephoto end and the whole focus range in which object distance extends from infinity to a point-blank distance.

SUMMARY OF THE INVENTION

In view of the foregoing, it is an object of the present invention to provide a zoom lens which can reduce the size and weight of the whole lens system while keeping its performances from largely fluctuating in the whole zoom range and whole focus range.

The zoom lens in accordance with the present invention comprises, successively from an object side, a first lens group having a positive refracting power, a second lens group having a negative refracting power, a third lens group having a negative refracting power, a fourth lens group having a positive refracting power, and a fifth lens group having a positive refracting power;

wherein a focal length of the whole system is changed as the second and third lens groups are moved in an optical axis direction; and wherein the second lens group comprises, successively from the object side, a second A lens group having a negative refracting power and a second B lens group having a positive refracting power, a distance between the second A and B lens groups being variable upon a change in the focal length so as to correct a fluctuation in aberration caused by the change in the focal length.

Preferably, the first lens group has a stationary negative lens group positioned closest to the object and at least one lens group which is movable in the optical axis direction so as to correct a fluctuation in image surface position caused by a change in object distance.

BRIEF DESCRIPTION OF THE DRAWINGS

FIG. 4A, 4B, 4C are aberration charts showing various kinds of aberration in a zoom lens in accordance with an example of the present invention at its wide angle end;

FIG. 5A, 5B, 5C are aberration charts showing various kinds of aberration in the zoom lens in accordance with the example of the present invention at its telephoto end;

FIG. 6A is an aberration chart showing astigmatism in a conventional example, and FIG. 6 is an aberration chart showing astigmatism in the example of the present invention at a magnification of 2×.

DESCRIPTION OF THE PREFERRED EMBODIMENTS

In the following, a zoom lens in accordance with an embodiment of the present invention will be explained with reference to the drawings.

Figure 1:
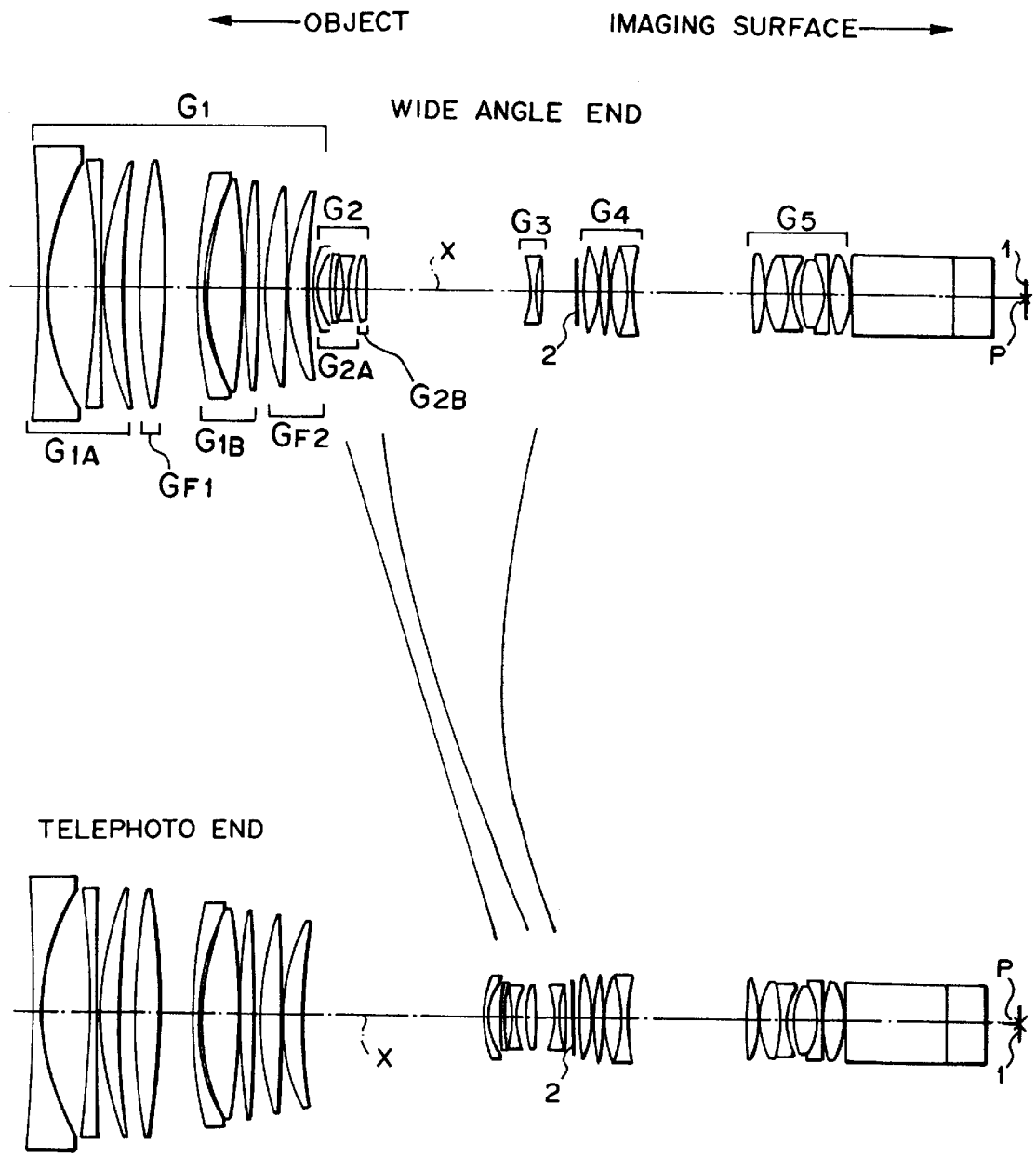
FIG. 1 is a view showing positional relationships of lens groups in a zoom lens in accordance with an embodiment of the present invention at its wide angle end and telephoto end.
Figure 2:
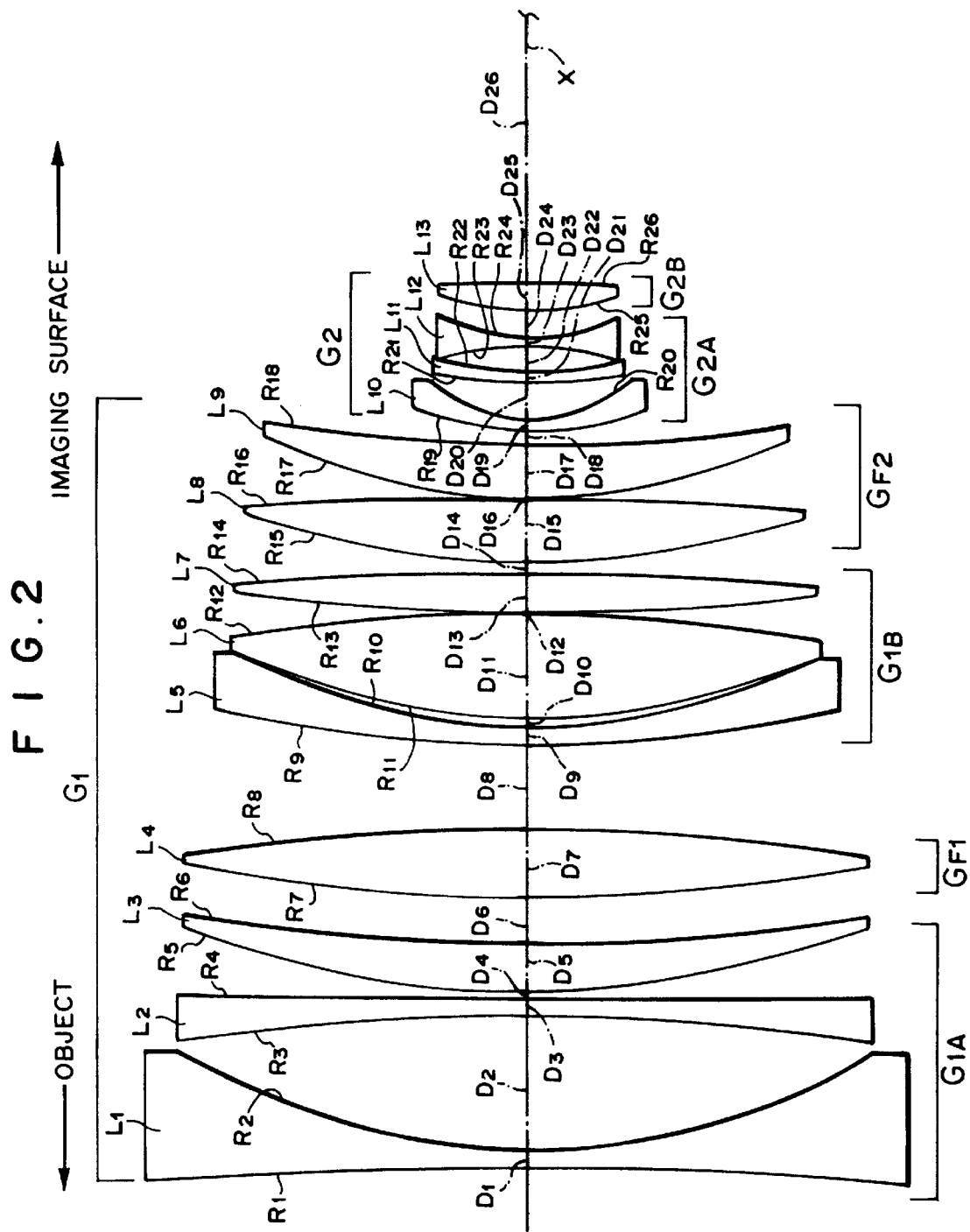
FIG. 2 is a view showing a lens configuration (first and second lens groups) of the zoom lens shown, in FIG. 1 at its wide angle end.
Figure 3:
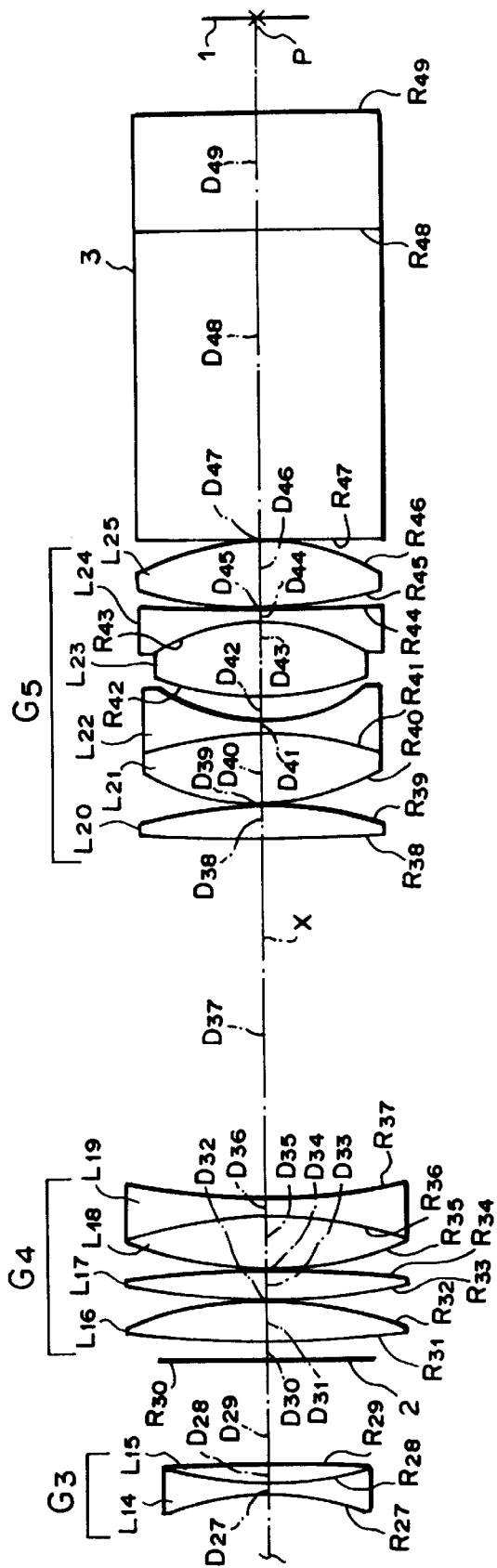
FIG. 3 is a view showing a lens configuration (third to fifth lens group) of the zoom lens shown in FIG. 1 at its wide angle end.

FIG. 1 is a view showing positional relationships of lens groups in a zoom lens in accordance with an embodiment of the present invention at its wide angle end and telephoto end; whereas FIGS. 2 and 3 are views showing lens configurations (FIG. 2 showing first and second lens groups, while FIG. 3 showing third to fifth lens groups) of this zoom lens at the wide angle end. Three curves depicted in the middle of FIG. 1 respectively indicate moving loci of second A, second B, and third lens groups from the wide angle end to the telephoto end.

The depicted zoom lens comprises, successively from an object side, the first lens group having a positive refracting power, the second lens group having a negative refracting power, the third lens group having a negative refracting power, the fourth lens group having a positive refracting power, and the fifth lens group having a positive refracting power; whereby a luminous flux incident thereon from the object side along an optical axis X forms an image at an imaging position P of a solid-state imaging device 1. Also, a stop 2 is disposed between the second and third lens groups, whereas an optical system 3 including a low-pass filter or the like is disposed downstream of the fifth lens group.

Further, the zoom lens is constituted such that the focal length of the whole system changes as the second and third lens groups are moved in the optical axis direction. The second lens group comprises, successively from the object side, a second A lens group having a negative refracting power and a second B lens group having a positive refracting power; whereas the distance between the second A and B lens groups is variable upon a change in the focal length so as to correct a fluctuation in aberration caused by the change in the focal length.

Namely, the second lens group is constituted by the second A lens group having a negative refracting power and the second B lens group having a positive refracting power, and the distance between the second A and B lens groups is altered upon a change in the focal length, so as to suppress fluctuations in aberration mainly in the middle range.

In a high-magnification zoom lens, aberration becomes greater at its telephoto end in general. When it is corrected such that its balance with the aberration at the wide angle end is taken into consideration, the correction tends to become insufficient in the middle range. In particular, it becomes difficult to establish a favorable balance between the image surface inclination and astigmatism, whereby the MTF is lowered in the middle range and at a middle angle of view.

When, in the second lens group having the highest refracting power, a surface spacing highly sensitive to the change in aberration is altered as in the case of the above-mentioned configuration, however, the above-mentioned correction can be effected with a favorable balance.

Specifically, as indicated by the moving loci in FIG. 1, during the movement from the wide angle end to the telephoto end, the second A and second B lens groups are moved such that the distance therebetween is narrowed in the middle range.

The amount of movement of the second B lens group with respect to that of the second A lens group is specifically defined as a function of the focal length of the whole lens system or zoom ratio, for example, according to the following expression (1). This expression takes into consideration the convenience of finally controlling the distance by lens driving means such as cam.

$$Y_1 = K1 \times X_1 \times X_1 + K2 \times X_1 \quad (1)$$

In this expression, $X_1$ is a logarithmic value of a zoom ratio, $Y_1$ is an amount of change in the distance between the second A and second B lens groups in a given range with respect to the distance between these lens groups at the wide angle end, and K1 and K2 are coefficients respectively set to the following values:

$K1 = 0.00785415$ $K2 = 0.0273345$

As mentioned above, in thus configured zoom lens, the second A and second B lens groups are configured so as to respectively become negative and positive. According to this configuration, the aberration balance can be made more favorable than that in the case where both second A and second B lens groups are made negative.

Further, in thus configured zoom lens, the first lens group comprises a stationary negative first A lens group disposed closest to the object and an F1 lens group which is movable in the optical axis direction so as to correct a fluctuation in image surface position caused by a change in object distance, thereby restraining the front lens from increasing its size and the performance from fluctuating due to the change in object distance.

Namely, in the above-mentioned configuration, the stationary first A lens group, the F1 lens group movable in the optical axis direction upon focusing, a stationary first B lens group, and an F2 lens group movable in the optical axis direction upon focusing are successively disposed from the object side. The F1 and F2 lens groups respectively move on the optical axis from the object side to the image surface side and from the image surface side to the object side as they come closer to a point-blank distance from infinity.

Here, the amount of movement of the F2 lens group is specifically defined as a function of the amount of movement of the F1 lens group, for example, according to the following expression (2). This expression, as in the case of the above-mentioned expression (1), takes into consideration the convenience of finally controlling the distance by lens driving means such as cam.

$$Y_2 = K3 \times X_2 \quad (2)$$

In this expression, $X_2$ is an amount of movement of the F1 lens group, $Y_2$ is an amount of movement of the F2 lens group, and K3 is a coefficient set to the following value:

$K3 = 0.0458489$

Further, in thus configured zoom lens, the first A lens closest to the object is made stationary, such that the lens does not extend upon focusing, whereby the whole length of the lens system is kept constant. Also, the front lens is prevented from increasing its diameter, whereby the whole lens system can reduce its size and weight.

EXAMPLE

In the following, the above-mentioned zoom lens will further be explained with reference to an example using specific numerical values.

Table 1 (follows) shows radius of curvature R (mm) of each lens surface, center thickness of each lens and air gap between neighboring lenses (collectively referred to as "axial spacing" hereinafter) D (mm), and refractive index N and Abbe number ν of each lens at d-line in the zoom lens in accordance with this example.

In Table 1, the reference numbers successively increase from the object side.

Table 2 (follows) shows values of $D_1$, $D_2$, $D_3$, and $D_4$ in the column of axial spacing D in Table 1 at each position of the wide angle end, middle range, and telephoto end. Further, the lower portion of this table shows focal length f, F number ($F_{NO}$) and half angle of view ω of the whole system.

Figure 7A:
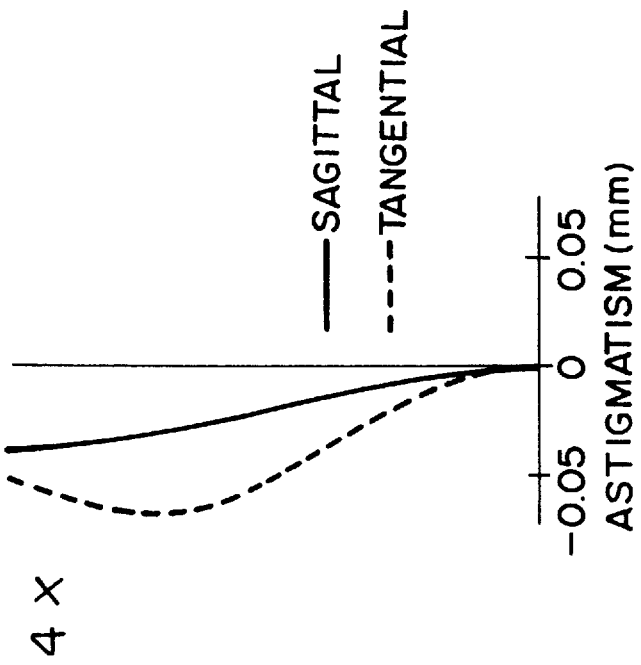
FIG. 7A is an aberration chart showing astigmatism in the conventional example.
Figure 7B:
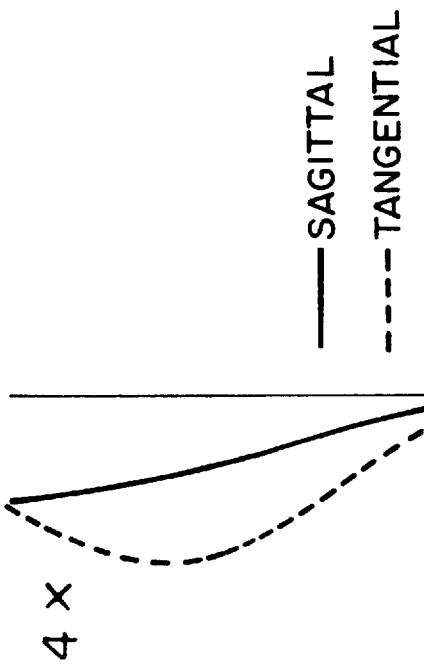
FIG. 7B is an aberration chart showing astigmatism in the example of the present invention at a magnification of 4×.

FIGS. 4 and 5 are aberration charts showing various kinds of aberration (spherical aberration, astigmatism, and distortion) of the zoom lens in accordance with this example at the wide angle end and telephoto end, respectively. FIGS. 6 and 7 are aberration charts showing, respectively at magnifications of 2× and 4×, astigmatism of a conventional example and that of this example. As can be seen from these aberration charts, aberration can favorably be corrected over the whole zoom range in accordance with the zoom lens of this example.

The zoom lens of the present invention should not be restricted to the above-mentioned example. For example, the number and form of lenses constituting each lens group can appropriately be selected.

As explained in the foregoing, in the zoom lens of the present invention, the second lens group is divided into the second A lens group having a negative refracting power and the second B lens group having a positive refracting power, and the distance between the second A and B lens groups is made variable upon a change in the focal length so as to correct a fluctuation in aberration caused by the change in the focal length. Accordingly, the size and weight of the whole lens system can be reduced, while the fluctuation in performance is kept low in the whole zoom range and whole focus range.

TABLE 1

| Surface | R | D | N | ν |
|---|---|---|---|---|
| 1 | −850.595 | 2.10 | 1.77250 | 49.6 |
| 2 | 80.028 | 17.18 | | |
| 3 | −243.159 | 1.90 | 1.77250 | 49.6 |
| 4 | 8548.804 | 1.00 | | |
| 5 | 107.753 | 5.46 | 1.84665 | 23.8 |

TABLE 1-continued

| Surface | R | D | N | ν |
|---|---|---|---|---|
| 6 | 232.963 | 1.00 | | |
| 7 | 204.538 | 7.43 | 1.43387 | 95.1 |
| 8 | −383.888 | 15.00 | | |
| 9 | 228.090 | 2.00 | 1.84665 | 23.8 |
| 10 | 83.953 | 1.20 | | |
| 11 | 90.418 | 12.51 | 1.43387 | 95.1 |
| 12 | −176.724 | 0.20 | | |
| 13 | 266.839 | 5.02 | 1.48749 | 70.2 |
| 14 | −367.239 | 1.64 | | |
| 15 | 111.257 | 7.17 | 1.48749 | 70.2 |
| 16 | −635.462 | 0.20 | | |
| 17 | 68.146 | 6.30 | 1.59240 | 68.3 |
| 18 | 169.079 | D1 | | |
| 19 | 38.382 | 1.00 | 1.81600 | 46.6 |
| 20 | 18.697 | 4.39 | | |
| 21 | 79.975 | 1.50 | 1.81600 | 46.6 |
| 22 | 40.524 | 3.00 | | |
| 23 | −41.208 | 1.00 | 1.81600 | 46.6 |
| 24 | 26.445 | D2 | | |
| 25 | 37.335 | 3.41 | 1.84665 | 23.8 |
| 26 | −210.053 | D3 | | |
| 27 | −25.746 | 1.00 | 1.77250 | 49.6 |
| 28 | 36.775 | 2.37 | 1.80517 | 25.4 |
| 29 | −317.275 | D4 | | |
| 30 | (Stop) | 2.00 | | |
| 31 | 129.631 | 4.34 | 1.53171 | 48.8 |
| 32 | −38.394 | 0.20 | | |
| 33 | 68.165 | 3.31 | 1.48749 | 70.2 |
| 34 | −113.371 | 0.20 | | |
| 35 | 40.037 | 5.97 | 1.48749 | 70.2 |
| 36 | −44.857 | 1.70 | 1.83480 | 42.7 |
| 37 | 64.334 | 39.00 | | |
| 38 | 146.669 | 4.17 | 1.51454 | 54.6 |
| 39 | −47.782 | 0.15 | | |
| 40 | 24.206 | 7.48 | 1.48749 | 70.2 |
| 41 | −46.326 | 1.50 | 1.83480 | 42.7 |
| 42 | 18.812 | 2.63 | | |
| 43 | 31.465 | 7.80 | 1.51680 | 64.2 |
| 44 | −20.919 | 1.50 | 1.81600 | 46.6 |
| 45 | 545.847 | 0.15 | | |
| 46 | 44.600 | 7.54 | 1.51823 | 58.9 |
| 47 | −24.599 | 1.00 | | |
| 48 | ∞ | 33.00 | 1.60859 | 46.4 |
| 49 | ∞ | 13.20 | 1.51633 | 64.0 |
| 50 | ∞ | | | |

TABLE 2

| | WIDE | MIDDLE | TELE |
|---|---|---|---|
| D1 | 2.24 | 43.13 | 61.99 |
| D2 | 4.23 | 3.66 | 3.91 |
| D3 | 56.13 | 12.35 | 5.81 |
| D4 | 11.22 | 14.68 | 2.11 | f=7.64 to 146.7 FNo.=2.27 to 3.24 Angle of view 2ω=3.8° to 75.6°

What is claimed is:

1. A zoom lens comprising, successively from an object side, a first lens group having a positive refracting power, a second lens group having a negative refracting power, a third lens group having a negative refracting power, a fourth lens group having a positive refracting power, and a fifth lens group having a positive refracting power;

wherein a focal length of the whole system is changed as said second and third lens groups are moved in an optical axis direction; and wherein said second lens group comprises, successively from the object side, a second A lens group having a negative refracting power and a second B lens group having a positive refracting power, a distance between said second A and B lens groups being variable upon a change in the focal length so as to correct a fluctuation in aberration caused by said change in the focal length.

2. A zoom lens according to claim 1, wherein said first lens group has a stationary negative lens group positioned closest to the object and at least one lens group which is movable in the optical axis direction so as to correct a fluctuation in image surface position caused by a change in object distance.

* * * * *